United States Patent Office 3,214,261
Patented Oct. 26, 1965

3,214,261
GRANULAR SOIL NEUTRALIZER AND THE PROCESS OF PREPARING SAID PRODUCT
Arthur L. Galloway, Mentor, Ohio, assignor to Diamond Alkali Company, Cleveland, Ohio, a corporation of Delaware
No Drawing. Filed Jan. 4, 1963, Ser. No. 249,344
6 Claims. (Cl. 71—51)

This invention relates to soil neutralizing compositions, and more particularly relates to granular soil neutralizers and their method of preparation and use.

Soil conditioners, particularly ground limestone ($CaCO_3$) and dolomitic limestone ($CaOMgO \cdot 2CO_2$), are widely used for application to soil in agricultural areas to reduce soil acidity. To a lesser extent, CaO and $Ca(OH)_2$ are used. The quality of a crushed limestone is determined by its purity and fineness. The various types of limestone materials dissolve in the acid soil moisture very slowly and, therefore, the rate of reaction with soil moisture to reduce soil acidity is essentially a function of the size of limestone particles and, to a lesser extent, the type of material and the degree of mixing with the soil. The finer the particle size, the greater is the specific surface which allows more material to be contacted by the moisture. The increase in specific surface will cause the limestone material to be dissolved faster, thereby neutralizing soil acidity at a faster rate than would be possible with coarsely ground material.

The limestone generally available for agricultural purposes typically consists of about 80% by weight of particles which pass through a No. 8 sieve (U.S. Bureau of Standards, Standard Screen Series, 1919), and 20% by weight of particles which will not pass a No. 8 sieve. Limestone, ground to this particle size, is generally slow in reacting in the soil and requires a period of more than three years for complete utilization. In order to utilize, within a period of approximately three years, 100% of the limestone applied, it must be ground to pass through a No. 60 sieve. Except for the disadvantages hereinafter stated, this size, or even finer sizes, would be very desirable for use in lawns and gardens, where fast-acting material is desirable. There are several agricultural uses where immediate utilization is desirable, such as in band planting and crop rotation systems in which subsequent crops require a different soil acidity for optimum growing conditions.

The use of soil conditioners, having a fine particle size, passing No. 60 sieve or finer, involves various handling problems. Caking in containers and in spreading devices is a serious handling problem requiring special equipment to overcome. The light particle weight of finely ground material will cause excessive amounts of dust, especially when a mechanical spreader is used to apply the conditioner to the soil. Moreover, the dust may be carried by air currents into areas where the soil conditioner is not wanted causing inefficient utilization of the product.

Dusting conditions cannot be allowed in urban areas, where lawn care and culture has developed in recent years, because dusting in such places would cause inconvenience not only to the user but to those living in the immediate vicinity. Care must be taken when applying a soil conditioner on lawns to prevent dust from being carried to nearby ornamental shrubs and plants which require comparatively acid soil.

Other conditioning materials have been used to achieve fast changes in soil acidity. CaO and $Ca(OH)_2$ are produced in extremely fine particle size and react quickly in the soil; however these materials are comparatively highly alkaline and must be applied sparingly because of the danger of raising the pH of the soil higher than desired. CaO is highly deliquescent and will dehydrate the foliage of plants contacted by the material. The highly alkaline conditon is commonly called "burning of the turf" and, although CaO and CaOH produce quick changes in soil acidity, they are not recommended for general use in soil conditioning.

The heretofore unsolved problem concerning soil neutralization has been the necessity of using slow-acting materials to avoid the difficulties encountered in handling and applying faster-acting, finely ground materials. The solution to the problem, until now, has been the compromise of the particle size and type of soil conditioner to permit convenient handling and to still retain a reasonable reaction rate in the soil. This compromise has not produced a satisfactory soil neutralizer which is capable of safe, convenient and quickly effective use.

It is therefore a principal object of this invention to provide a fast-acting soil neutralizer that avoids the problems previously encountered with finely divided soil neutralizers.

Another object of this invention is to provide a fast-acting, free-flowing, non-dusting limestone for application to turf.

Another object of this invention is to provide a fast-acting soil neutralizer that does not present the danger of burning the turf.

These and other objects and advantages of this invention will appear more fully from the following description thereof.

This invention comprises a fast-acting, free-flowing, dry granular soil neutralizer which disintegrates readily when contacted by water or soil moisture and is capable of withstanding normal handling and application methods, said granules consisting of a finely divided soil conditioner and a binding agent.

The term "soil conditioner," as used in the specification and claims, is intended to mean a compound or composition used to raise the pH of the soil.

According to the method of this invention a finely ground soil conditioner is mixed with a water-soluble, non-phytotoxic binding agent and fed into a granulator, such as a disc granulator wherein it is contacted, e.g., sprayed with a liquid granulating agent, preferably water.

A granulating agent is any material which activates the binding agent. In the practice of this invention, water-activated binding agents are used and therefore water is the most economic and preferred granulating agent.

The wet, granulated material emerging from the granulator is dried and screened to obtain a desirable granule size. The oversize granules are passed through a crusher, or are otherwise comminuted to obtain additional granules of the desired size. The finer material may be regranulated alone or returned to the granulator with new feed material.

The method of this invention is useful in granulating various types of materials used to raise the pH of soil. Limestone is most frequently used for this purpose and therefore is the preferred material to be employed. As used in the specification and claims, the term "limestone" is intended to mean the natural form of calcium carbonate which may contain minor amounts of magnesium carbonate. A calcium oxide-magnesium oxide compound, having the general formula $CaOMgO \cdot 2CO_2$, is commonly called dolomitic limestone and is also a preferred soil neutralizer for use in producing compositions of this invention.

In some instances marl, chalk and crushed oyster shells may be employed in the practice of this invention in place of limestone.

The soil conditioner is ground to a fineness which will provide a desired reactivity in the soil. For most agricultural purposes a soil conditioner having a particle size which will pass through No. 60 or No. 100 sieves (U.S. Bureau of Standards, Standard Screen Series, 1919) is desirable when relatively rapid utilization of the soil conditioner is desired. By the method of this invention a soil neutralizer of a specific reactivity can be applied to the soil because, when the granules are wetted by rain or soil moisture, they disintegrate and return the soil conditioner to its particle size prior to the formation of the granule.

The term "binding agent," as used in the specification and claims, is intended to mean any material added to the soil conditioner used in the method of this invention which will, when contacted by the granulating agent, act upon the soil conditioner to cause cohesion of the particles. The binding agent must permit the granule to disintegrate when water or soil moisture is placed in contact with the granule.

The ground soil conditioner is mixed with a binding agent such as diammonium phosphate, urea, or ammonium sulfate which is preferred. The soil conditioner and binding agent are mixed together in the dry state at the weight ratio of about 90% to 97% by weight soil conditioner to 3% to 10% by weight binding agent. It has been found most convenient to use about 5% binding agent with 95% soil conditioner.

It has also been found that, when limestone containing little or no magnesium is used, an additional binding agent such as calcium sulfate dihydrate is required. Approximately 3% to 7% by weight of additional binding agent is added to the dry mix, reducing the amount of limestone proportionately.

The dry mix is then granulated by the addition of a granulating agent. In the preferred method of this invention a disc granulator is employed, wherein the dry mix is sprayed with water in the amount of 10% to 20% by weight of the dry material. The amount of water employed is sufficient only to activate the binding agent, which amount is less than that required to make a paste or slurry of the mixture. The exact amount of water required for granulation is dependent upon the type of soil conditioner employed.

The resulting granules are dried at 150° to 200° F. and screened to recover a material of the desired size. A size which has been generally accepted as desirable from the standpoint of handling and free-flowing properties is that size which will pass through a No. 8 sieve and will be retained on a No. 20 sieve. The oversize material may be crushed to that size and the finer material may be reprocessed by adding it to the dry-mixed material being fed into the granulator, or by adding the fines into a granulator independent of fresh dry mix.

The granules of this invention disintegrate rapidly when contacted by water to the particle size of the soil conditioner which was fed into the granulator. The advantages of a small particle size of a soil conditioner placed in the soil is achieved, while at the same time avoiding the difficulties involved in handling material of small particle size. The rapid disintegration of the granules renders the soil conditioner readily available to the soil. Since the most commonly used soil conditioners, such as limestone and dolomitic limestone, do not produce high alkalinity when reacted with soil moisture, there is no danger of burning the turf.

The capacity of ground soil conditioner to neutralize soil acidity is expressed as its neutralizing value in terms of pure calcium carbonate as 100. The values given to soil conditioners are theoretical in that all of the active material applied to the soil must react to attain the given value. Thus, a coarsely ground soil conditioner, having a relatively high neutralizing value, will not create the desired change in soil acidity until a number of years have passed after application to the soil.

Although one soil conditioner may have a lower neutralizing value than another, its ability to reduce soil acidity in a short period of time may be much greater. Granular soil neutralizers, produced by the method of this invention, may have slightly lower neutralizing values than that of the original material used to make the granules. The reduction is caused by the acidic influence of the binding agent and dilution of the active material. The reactivity of the original soil conditioner is not impaired by the method of producing the granule. The desired change in soil acidity is brought about much faster by the granulated material than by the soil conditioner having the same neutralizing value but ground to the particle size of the granules.

In order that those skilled in the art may more completely understand the present invention and the preferred methods by which the same may be carried into effect, the following specific examples are offered.

EXAMPLE 1

A dry mixture of finely divided dolomitic limestone and crystalline commercial grade ammonium sulfate is made by adding 95 g. of dolomitic limestone having a neutralizing value of 108, and which contains a minimum of 54.69% calcium carbonate and 44.38% magnesium carbonate together with 5 g. of ammonium sulfate to a mechanical mixer. This mixture is fed into a Standard Dravo disc granulator having a 39-inch diameter pelletizing pan, using water as the liquid granulating agent. The feed rate of the dry mixture is 5 pounds per minute and water is sprayed onto the mixture at the rate of 300 ml. per minute. The disc is rotated at 13.5 r.p.m. at an angle of 46° off the vertical.

The wet granulated material, which contains 11% moisture, is dried in an oven at 160° F. until the granules attain a constant weight. After drying, the material is screened to obtain material which passes through a No. 8 sieve and is retained by a No. 20 sieve. Approximately 60% of the material removed from the oven is obtained. The oversize material is passed through a roll crusher with 0.47-inch opening to obtain additional material, giving a total yield of 83.0% of the desired particle size. The fine material may be added to the fresh feed into the disc granulator for regranulation or passed to a second granulator alone. The dried limestone granules contain a minimum of 51.97% calcium carbonate and 42.16% magnesium carbonate, and have a neutralizing value of 97.1.

EXAMPLE 2

A granular soil neutralizer is prepared by mixing, in the dry state, finely divided limestone, containing a minor amount of magnesium carbonate with 5% by weight of crystalline, commercial grade ammonium sulfate and 5% by weight of agricultural grade gypsum ($CaSO_4 \cdot 2H_2O$). The dry material is granulated as described in Example 1. The wet granules, recovered from the granulator, are dried and processed as described in Example 1, yielding a hard, serviceable granule capable of withstanding the handling required for application to the soil as indicated in Table I.

EXAMPLE 3

A granulated material is prepared by mixing 95 g. of finely divided dolomitic limestone and 5 g. of diammonium phosphate. The dry mixture is fed into a disc granulator under conditions described in Example 1, yielding the granular material. Upon drying, the granules are capable of withstanding the handling required for application to the soil, as indicated in Table I.

EXAMPLE 4

A granulated material is prepared by mixing, in the dry state, 95 g. finely divided dolomitic limestone to which is added 5 g. of urea. The dry mixture is fed into a disc granulator under conditions described in Example 1, yielding the granular material. Upon drying, the granules are capable of withstanding the handling required for application to the soil, as indicated in Table I.

EXAMPLE 5

The mechanical breakdown of the granules, produced in the previous examples, is determined by placing 3 g. of the granules into an 8-ounce glass jar, together with 120 one-quarter inch and 14 one-half inch steel balls. The jar is placed on its side and rotated by a mechanical motor-driven device at a constant speed of 25 r.p.m. for exactly two minutes. After rotating, the contents of the jar are placed into a 3-inch diameter U.S. Standard No. 60 sieve over a pan. The screen is rotated and tapped lightly after removal of the steel balls from the sample until all fine material is collected in the pan. The contents of the pan are weighed. Percent mechanical breakdown is calculated by the ratio of the weight of fines collected in the pan to the total weight of the sample multiplied by 100. The results obtained by the above described test appear in Table I, indicating that the granules produced according to the method of this invention are hard and capable of being handled and applied to the soil surface by means of mechanical spreaders without excessive damage.

*Table I*

| Granules Produced in Example | 1 | 2 | 3 | 4 |
|---|---|---|---|---|
| Percent Mechanical Breakdown | 7.8 | 11.1 | 5.7 | 14.7 |

EXAMPLE 6

The ability of the granules produced in the previous examples to disintegrate into the original particle size of the limestone is demonstrated by the following test. Into an 8-ounce glass jar is placed 100 ml. of water, together with 1 g. of granules. The jar is placed in a 1-inch stroke mechanical shaker and oscillated at 280 cycles per minute for a period of two minutes. After shaking, the contents of the jar are transferred to a 3-inch diameter No. 60 sieve.

Into a crystalizing dish (19 cm. dia. x 10 cm. high) is placed 800 ml. of water, after which the sieve is place into the water allowing the water to rise upward through the screen. After the screen is immersed it is immediately raised to permit the water to drain out. The immersion is repeated ten times. The sieve containing the residue is dried to constant weight at 100° C. The percent by weight of material which passed through the screen is determined. The results obtained are listed in Table II, together with the sieve tests of the original material before granulation.

*Table II*

| Granules from Example— | Percent Material Passing Through U.S. Standard Sieve No. 60 | |
|---|---|---|
| | Granulated Material | Original Material |
| 1 | 98 | 99 |
| 2 | 77 | 98 |
| 3 | 94.7 | 99 |
| 4 | 99.1 | 99 |

EXAMPLE 7

To demonstrate the non-deliquescence of the granules of this invention, a weighted sample of bone-dry granules, prepared according to Example 1, is exposed to the atmosphere which has a relative humidity of 68% at a temperature of 72° F. until they have attained a constant weight. A moisture determination showed the granules had taken up only 0.34% moisture.

The foregoing examples demonstrate the achievement of a safe, conveniently handled, fast-acting soil neutralizer. The reactivity in the soil of the conditioner is increased by finely dividing the material. Granulation of the particles solves the problem previously encountered in handling finely divided material. The accomplishment of these previously opposed goals, i.e., fast-acting and easily handled, is brought about by forming a hard granule which disintegrates readily after being placed in the soil to yield the original particle size of the conditioner. Some soil conditioners may be granulated without employing a binding agent; however, the granules are soft and disintegrate easily rendering them unusable. The binding agent contributes to the granule a hardness otherwise unobtainable. Quick changes in soil acidity are brought about without the use of high pH material, thus removing the danger of burning the turf.

It is to be understood that although the invention has been described with specific reference to particular embodiments thereof, it is not to be limited since changes and alterations therein may be made which are within the full intended scope of this invention as defined by the appended claims.

What is claimed is:

1. A granular soil neutralizer consisting essentially of 90% to 97% by weight of a finely-divided soil conditioner selected from the group consisting of limestone and dolomitic limestone, and 3% to 10% by weight of a binding agent selected from the group consisting of ammonium sulfate, diammonium phosphate and urea; said binding agent causing cohesion of said soil conditioner into granules and permitting the granules to disintegrate when in contact with water; said granules being of a size such that they will pass through a No. 8 sieve and be retained on a No. 20 sieve.

2. A granular soil neutralizer according to claim 1 which consists of 95% by weight dolomitic limestone and 5% by weight ammonium sulfate.

3. A granular soil neutralizer according to claim 1 which consists of 90% by weight limestone, 5% by weight ammonium sulfate and 5% by weight calcium sulfate dihydrate.

4. A granular soil neutralizer according to claim 1 which consists of 95% by weight dolomitic limestone and 5% by weight urea.

5. A granular soil neutralizer according to claim 1 which consists of 95% by weight dolomitic limestone and 5% by weight diammonium phosphate.

6. The process of preparing a granular soil neutralizer which comprises
   (1) mixing about 90% to 97% by weight of a dry, finely-divided soil conditioner selected from the group consisting of limestone and dolomitic limestone, with about 3% to 10% by weight of a dry binding agent selected from the group consisting of ammonium sulfate, diammonium phosphate and urea;
   (2) agitating the mixture and gradually adding about 10% to 20% by weight of water, based on the weight of the dry material, to the dry mixture to form granules, said water being sufficient in amount to activate the binding agent and less than an amount required to form a slurry;
   (3) drying the granules at a temperature of about 150° to 200° F.; and
   (4) screening the dried granules to recover the granular soil neutralizer, having a particle size which will pass through a No. 8 sieve and be retained on a No. 20 sieve; said granules containing about 90% to 97% by weight of said soil conditioner and about 3% to 10% by weight of said binding agent.

(References on following page)

References Cited by the Examiner

UNITED STATES PATENTS

| | | | |
|---|---|---|---|
| 847,749 | 3/07 | Ellis | 71—24 |
| 2,005,997 | 6/35 | Krauch et al. | 71—59 |
| 2,041,088 | 5/36 | Pfirrmann | 23—313 |
| 2,798,801 | 7/57 | Kieffer et al. | 71—64 |
| 2,893,858 | 7/59 | MacDonald et al. | 71—64 |
| 2,955,930 | 10/60 | Kealy | 71—64 |
| 3,021,207 | 2/62 | Stengel | 71—64 |
| 3,024,098 | 3/62 | Austin et al. | 71—64 |
| 3,027,249 | 3/62 | Jost | 71—64 |
| 3,085,870 | 4/63 | Bradford et al. | 71—28 |

DONALL H. SYLVESTER, *Primary Examiner.*

ANTHONY SCIAMANNA, *Examiner.*